US012466192B2

(12) United States Patent
Koase

(10) Patent No.: US 12,466,192 B2
(45) Date of Patent: Nov. 11, 2025

(54) LIQUID EJECTING DEVICE

(71) Applicant: SEIKO EPSON CORPORATION, Tokyo (JP)

(72) Inventor: Takashi Koase, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 89 days.

(21) Appl. No.: 18/159,150

(22) Filed: Jan. 25, 2023

(65) Prior Publication Data

US 2023/0234360 A1 Jul. 27, 2023

(30) Foreign Application Priority Data

Jan. 25, 2022 (JP) ................................ 2022-009254

(51) Int. Cl.
*B41J 2/17* (2006.01)
*B41J 2/165* (2006.01)
(Continued)

(52) U.S. Cl.
CPC ............ *B41J 2/19* (2013.01); *B41J 2/16502* (2024.05); *B41J 2/16508* (2013.01);
(Continued)

(58) Field of Classification Search
CPC . B41J 2/17; B41J 2/1707; B41J 2/1714; B41J 2/1721; B41J 2/175; B41J 2/17503; B41J 2/17563; B41J 2/17596; B41J 2/19; B41J 2/165; B41J 2/16502; B41J 2/16505; B41J 2/16508; B41J 2/16517; B41J 2/1652; B41J 2/16523; B41J 2/21
See application file for complete search history.

(56) References Cited

U.S. PATENT DOCUMENTS

2005/0195246 A1 9/2005 Ogawa
2013/0187985 A1* 7/2013 Katoh ..................... B41J 2/175
347/47

(Continued)

FOREIGN PATENT DOCUMENTS

JP H08267786 A * 10/1996
JP 2005125635 5/2005

(Continued)

*Primary Examiner* — Douglas X Rodriguez
*Assistant Examiner* — Kendrick X Liu
(74) *Attorney, Agent, or Firm* — WORKMAN NYDEGGER

(57) ABSTRACT

A liquid ejecting device includes a head including a nozzle and configured to eject, from the nozzle, liquid supplied from a plurality of supply sources, a plurality of supply channels coupled to the plurality of supply sources and the head, a plurality of reservoir portions located respectively at the plurality of supply channels, each of the plurality of reservoir portions including a storage chamber configured to store the liquid supplied from the plurality of supply sources, a plurality of discharging channels respectively coupled to the plurality of reservoir portions, and each configured to eject a bubble from the plurality of storage chambers, and a suctioning portion configured to apply a negative pressure to the plurality of discharging channels. Each of the plurality of discharging channels includes a resistance portion with a larger pressure loss than a corresponding supply channel of the plurality of supply channels.

8 Claims, 2 Drawing Sheets

(51) Int. Cl.
*B41J 2/175* (2006.01)
*B41J 2/19* (2006.01)
*B41J 2/21* (2006.01)

(52) U.S. Cl.
CPC ......... *B41J 2/1652* (2013.01); *B41J 2/16523* (2013.01); *B41J 2/1707* (2013.01); *B41J 2/1714* (2013.01); *B41J 2/1721* (2013.01); *B41J 2/17503* (2013.01); *B41J 2/17563* (2013.01); *B41J 2/17596* (2013.01); *B41J 2/21* (2013.01)

(56) References Cited

U.S. PATENT DOCUMENTS

2018/0281423 A1* 10/2018 Ueda .................... B41J 2/17509
2022/0203694 A1 6/2022 Koase

FOREIGN PATENT DOCUMENTS

JP 2010-179661 A 8/2010
JP 2022-101000 A 7/2022

* cited by examiner

LIQUID EJECTING DEVICE

The present application is based on, and claims priority from JP Application Serial Number 2022-009254, filed Jan. 25, 2022, the disclosure of which is hereby incorporated by reference herein in its entirety.

BACKGROUND

1. Technical Field

The present disclosure relates to a liquid ejecting device.

2. Related Art

JP-A-2010-179661 discloses a liquid ejecting device including a plurality of reservoir portions that store liquid, a head that ejects the liquid stored in the plurality of reservoir portions, and a plurality of discharging channels that extend from the plurality of reservoir portions. JP-A-2010-179661 discloses that bubbles in the reservoir portion are ejected by suctioning the plurality of reservoir portions through the plurality of discharging channels.

In such a liquid ejecting device, the amount of bubbles may be uneven among the plurality of reservoir portions. In this case, when the plurality of reservoir portions are suctioned, there is a risk of occurrence of a situation where while the bubbles are ejected from one reservoir portion, the liquid is ejected from another reservoir portion. Consequently, there is a risk of wasteful consumption of the liquid from the reservoir portion.

SUMMARY

A liquid ejecting device for solving the above-described problems includes a head including a nozzle and configured to eject, from the nozzle, liquid supplied from a plurality of supply sources, a plurality of supply channels coupled to the plurality of supply sources and the head, a plurality of reservoir portions located respectively at the plurality of supply channels, each of the plurality of reservoir portions including a storage chamber configured to store the liquid supplied from the plurality of supply sources, a plurality of discharging channels respectively coupled to the plurality of reservoir portions, and each configured to eject a bubble from the plurality of storage chambers, and a suctioning portion configured to apply a negative pressure to the plurality of discharging channels. Each of the plurality of discharging channels includes a resistance portion with a larger pressure loss than a corresponding supply channel of the plurality of supply channels.

DESCRIPTION OF EXEMPLARY EMBODIMENTS

An embodiment of a liquid ejecting device is described below with reference to the drawings. The liquid ejecting device is an example of an ink-jet printer that prints an image such as a letter and a photograph on a medium such as a sheet and fabric by ejecting ink as an example of liquid thereto, for example.

General Configuration of Liquid Ejecting Device

Figure 1:
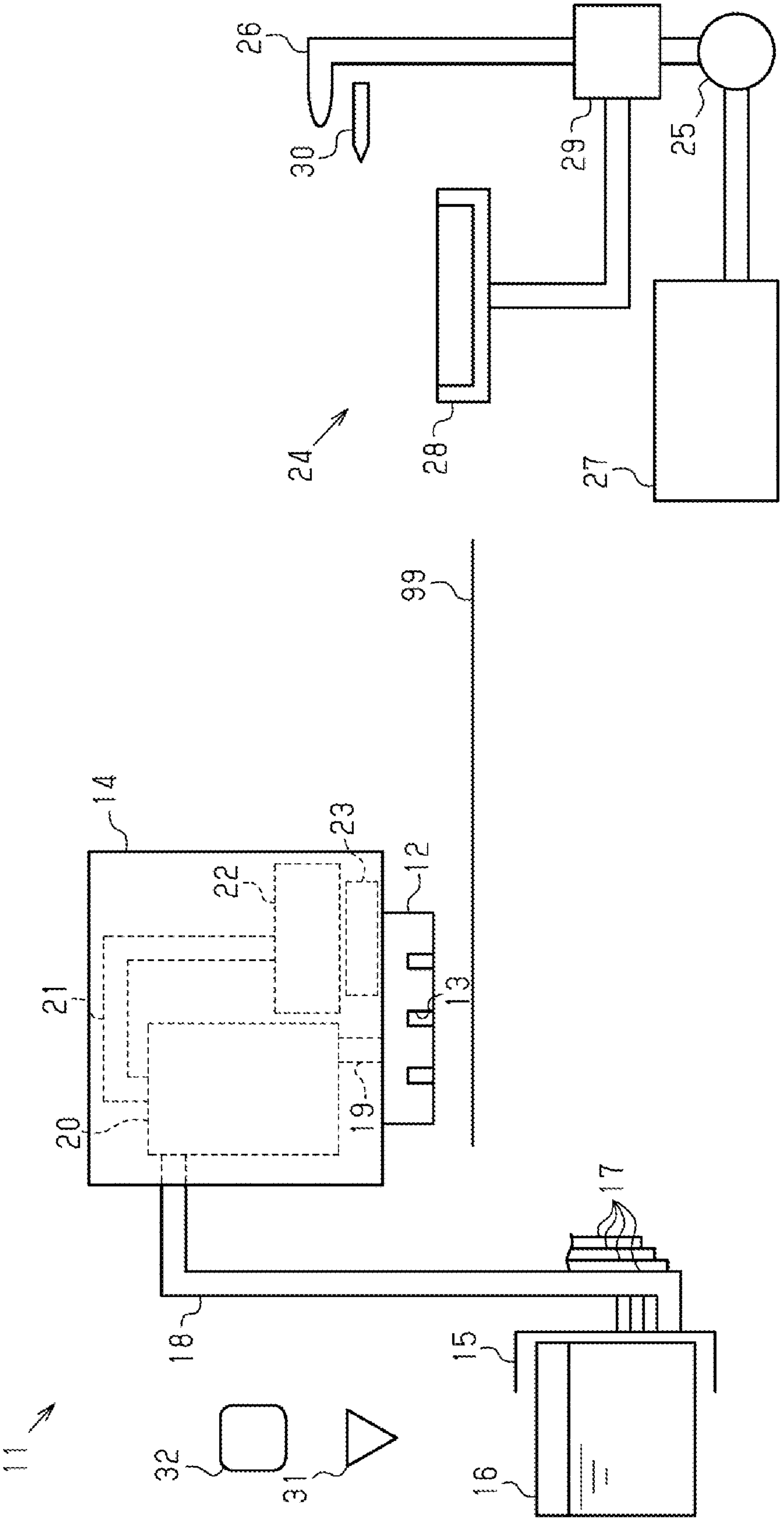
FIG. 1 is a schematic view illustrating an exemplary liquid ejecting device.

As illustrated in FIG. 1, a liquid ejecting device 11 includes a head 12. The head 12 is configured to eject the liquid. The head 12 includes a nozzle 13. The nozzle 13 ejects the liquid. The head 12 prints an image on a medium 99 by ejecting the liquid to the medium 99 from the nozzle 13.

The liquid ejecting device 11 includes a carriage 14, for example. The head 12 is mounted in the carriage 14. The carriage 14 is configured to perform scanning with respect to the medium 99. Therefore, the liquid ejecting device 11 of this example is a printer of a serial type. The liquid ejecting device 11 may be a printer of a line type that can simultaneously eject the liquid over the width of the medium 99.

The liquid ejecting device 11 includes a mounting unit 15. The mounting unit 15 is configured to mount a plurality of supply sources 16. Four supply sources 16 can be mounted to the mounting unit 15, for example. The supply source 16 is an ink tank, an ink cartridge or the like, for example. The four supply sources 16 store respective liquids different from each other, for example. The four supply sources 16 store cyan ink, magenta ink, yellow ink, and black ink, for example. The drawing illustrates only one supply source 16.

The liquid ejecting device 11 includes a plurality of supply channels 17. The liquid ejecting device 11 includes four supply channels 17, for example. The plurality of supply channels 17 are channels for supplying the liquid from the plurality of supply sources 16 to the head 12. The head 12 ejects, to the nozzle 13, the liquid supplied from the plurality of supply sources 16.

The plurality of supply channels 17 are coupled to the plurality of supply sources 16 and the head 12. The plurality of supply channels 17 are coupled to respective supply sources 16. The plurality of supply channels 17 are coupled to the head 12. That is, one supply channel 17 is coupled to one supply source 16 and the head 12. The supply channel 17 extends from the mounting unit 15. The supply channel 17 is coupled to the supply source 16 when the supply source 16 is mounted to the mounting unit 15.

The supply channel 17 includes a first supply channel 18 and a second supply channel 19, for example. The first supply channel 18 is coupled to the supply source 16. The second supply channel 19 is coupled to the head 12. In the supply channel 17, the liquid flows through the first supply channel 18 and the second supply channel 19 in this order. The first supply channel 18 extends inside and outside the carriage 14. The second supply channel 19 extends inside the carriage 14.

The liquid ejecting device 11 includes a plurality of reservoir portions 20. The liquid ejecting device 11 includes four reservoir portions 20, for example. The drawing illustrates only one reservoir portion 20. The plurality of reservoir portions 20 are located at respective supply channels 17. That is, one reservoir portion 20 is located at one supply channel 17. The reservoir portion 20 is located between the first supply channel 18 and the second supply channel 19, for example. The reservoir portion 20 is mounted in the carriage 14, for example. The reservoir portion 20 stores the liquid supplied from the supply source 16. The configuration of the reservoir portion 20 will be described later.

The liquid ejecting device 11 includes a plurality of discharging channels 21. The liquid ejecting device 11 includes four discharging channels 21, for example. The drawing illustrates only one discharging channel 21. The plurality of discharging channels 21 extend from respective reservoir portions 20. That is, one discharging channel 21 extends from one reservoir portion 20. The plurality of discharging channels 21 are mounted in the carriage 14, for example.

The discharging channel 21 is a channel for ejecting the bubbles in the reservoir portion 20. Bubbles may be contained in the liquid supplied from the supply source 16 to the reservoir portion 20. As such, the bubbles tend to be retained in the upper part in the reservoir portion 20. The discharging channel 21 is coupled to an upper part of the reservoir portion 20, for example. The configuration of the discharging channel 21 will be described later.

The liquid ejecting device 11 may include a confluence channel 22. The confluence channel 22 is coupled to the plurality of discharging channels 21. When coupled to the plurality of discharging channels 21, the confluence channel 22 is joined with the plurality of discharging channels 21. The confluence channel 22 is mounted in the carriage 14, for example. The configuration of the confluence channel 22 will be described later.

The liquid ejecting device 11 may include an opening unit 23. The opening unit 23 is mounted in the carriage 14. The opening unit 23 is configured to open the discharging channel 21. For example, when the opening unit 23 opens the discharging channel 21, the bubbles can flow from that discharging channel 21 to the confluence channel 22. The configuration of the opening unit 23 will be described later.

The liquid ejecting device 11 includes a maintenance unit 24. The maintenance unit 24 is a unit for the maintenance of the liquid ejecting device 11.

The maintenance unit 24 includes a suctioning portion 25. The suctioning portion 25 is a pump, for example. More specifically, the suctioning portion 25 is a tube pump. The suctioning portion 25 is coupled to the plurality of discharging channels 21, for example. In this example, the suctioning portion 25 is coupled to the plurality of discharging channels 21 when coupled to the confluence channel 22. The suctioning portion 25 may be directly coupled to the plurality of discharging channels 21, for example. In this example, when the carriage 14 is moved to a predetermined position, the suctioning portion 25 is coupled to the plurality of discharging channels 21. The predetermined position will be described later. When the carriage 14 is located at a home position, the suctioning portion 25 is coupled to the plurality of discharging channels 21, for example. The home position is a position where the carriage 14 stands by when the head 12 does not eject the liquid to the medium 99, for example. The suctioning portion 25 may be coupled to the plurality of discharging channels 21 at all times. Through suctioning, the suctioning portion 25 applies a negative pressure to the plurality of discharging channels 21. In this manner, the suctioning portion 25 suctions the bubbles retained at the reservoir portion 20. In this manner, the bubbles are ejected from the reservoir portion 20.

The maintenance unit 24 may include a coupling portion 26. The coupling portion 26 is coupled to the suctioning portion 25. The coupling portion 26 can be coupled to the confluence channel 22, for example. When the coupling portion 26 is coupled to the confluence channel 22, the suctioning portion 25 is coupled to the plurality of discharging channels 21. The suctioning portion 25 applies a negative pressure to the plurality of discharging channels 21 through the coupling portion 26, for example. The coupling portion 26 may be directly coupled to the plurality of discharging channels 21. The coupling portion 26 may be coupled to the plurality of discharging channels 21 at all times.

When the carriage 14 moves to a predetermined position, the coupling portion 26 is coupled to the confluence channel 22, for example. More specifically, the coupling portion 26 is coupled to the confluence channel 22 in the process in which the carriage 14 moves to the predetermined position. When the carriage 14 is located at the home position, the coupling portion 26 is inserted in the confluence channel 22. At this time, the coupling portion 26 is coupled to the confluence channel 22. When the carriage 14 comes closer to the coupling portion 26 from the home position, the coupling portion 26 is further inserted in the confluence channel 22. The predetermined position is a position closer to the coupling portion 26 than the home position. In the process of moving to the predetermined position, the carriage 14 passes through the home position. Thus, when the carriage 14 moves to the predetermined position, the coupling portion 26 is inserted in the confluence channel 22.

When the confluence channel 22 is inserted in the coupling portion 26, the coupling portion 26 is coupled to the confluence channel 22. In this manner, in comparison with the case where the coupling portion 26 is coupled to the confluence channel 22 at all times, it is not necessary to lay out the coupling portion 26 to follow the carriage 14 in the liquid ejecting device 11. Thus, the configuration of the liquid ejecting device 11 is simplified.

The maintenance unit 24 may include a containing unit 27. The containing unit 27 is coupled to the suctioning portion 25. The bubbles and liquid suctioned by the suctioning portion 25 are ejected to the containing unit 27. The containing unit 27 contains the waste liquid generated by the maintenance.

The maintenance unit 24 may include a cap 28. The cap 28 is configured to make contact with the head 12. The cap 28 covers the nozzle 13 by making contact with the head 12. The contact of the cap 28 with the head 12 in a manner of covering the nozzle 13 is referred to as capping. The capping forms a space leading to the nozzle 13 in the cap 28. The capping suppresses drying of the nozzle 13.

The cap 28 is configured to displace to a position where it makes contact with the head 12 and a position where it does not make contact with the head 12. The cap 28 is configured to be able to move up and down, for example. The cap 28 makes contact with the head 12 by moving up in the state of facing the head 12. For example, the cap 28 can make contact with the head 12 when the carriage 14 is located at the home position.

The cap 28 may be coupled to the suctioning portion 25. In this case, the suctioning portion 25 suctions the inside of the discharging channel 21 and the inside of the cap 28. Specifically, the suctioning portion 25 suctions the inside of the confluence channel 22 and the inside of the cap 28.

The suctioning portion 25 suctions the liquid from the cap 28 by suctioning the inside of the cap 28. For example, when the suctioning portion 25 suctions the inside of the cap 28 in the capping state of the cap 28, the negative pressure in the cap 28 acts on the nozzle 13. In this manner, thickened liquid, solidified liquid and the like are ejected from the nozzle 13. That is, the maintenance unit 24 performs cleaning of the head 12. The liquid suctioned from the cap 28 is housed in the containing unit 27.

The maintenance unit 24 may include a switching portion 29. In the maintenance unit 24, the switching portion 29 is located between the suctioning portion 25 and the coupling portion 26, and between the suctioning portion 25 and the cap 28. That is, the suctioning portion 25 is coupled to the coupling portion 26 through the switching portion 29. The suctioning portion 25 is coupled to the cap 28 through the switching portion 29.

The switching portion 29 is configured to switch the coupling destination of the suctioning portion 25. Specifically, the switching portion 29 switches the coupling destination of the suctioning portion 25 between the coupling portion 26 and the cap 28, for example. The switching portion 29 is a switching valve, for example. In this manner, one suctioning portion 25 can apply a negative pressure to both the discharging channel 21 and the cap 28. That is, the configuration of the liquid ejecting device 11 is simplified. The maintenance unit 24 may include a pump coupled to the cap 28 separately from the suctioning portion 25 coupled to the discharging channel 21.

The maintenance unit 24 includes a starting unit 30, for example. The starting unit 30 makes contact with the opening unit 23. The starting unit 30 makes contact with the opening unit 23 when the carriage 14 is located at a predetermined position, for example. More specifically, the starting unit 30 makes contact with the opening unit 23 when the carriage 14 moves to the predetermined position from the home position. The starting unit 30 is a protrusion, for example.

By making contact with the opening unit 23, the starting unit 30 causes the opening unit 23 to open the discharging channel 21. When the starting unit 30 makes contact with the opening unit 23, the bubbles can flow from the discharging channel 21 to the confluence channel 22. That is, the starting unit 30 starts the removal of the bubbles from the reservoir portion 20. In this example, when the carriage 14 does not located at the predetermined position, the discharging channel 21 is closed. Thus, the risk of leakage of the liquid from the discharging channel 21 during the printing and the printing standby state is reduced.

The liquid ejecting device 11 may include a detection portion 31. The detection portion 31 is configured to detect the environmental temperature. The detection portion 31 is a temperature sensor, for example. The environmental temperature is the temperature of the space where the liquid ejecting device 11 is installed, the temperature inside the liquid ejecting device 11, and the like, for example.

The liquid ejecting device 11 includes a control portion 32. The control portion 32 controls the liquid ejecting device 11. The control portion 32 controls the head 12, the carriage 14, the maintenance unit 24 and the like, for example. The control portion 32 controls the suctioning portion 25. The control portion 32 controls the suction flow rate of the suctioning portion 25 by controlling the rotational frequency of the suctioning portion 25, for example. The suction flow rate is the volume of the fluid suctioned per unit time, for example. The greater the suction flow rate, the greater the negative pressure applied by the suctioning portion 25.

The control portion 32 controls the suction flow rate of the suctioning portion 25 on the basis of the environmental temperature detected by the detection portion 31, for example. When the environmental temperature changes, the viscosity of the liquid changes. More specifically, the lower the environmental temperature, the greater the viscosity of the liquid. Therefore, the control portion 32 changes the suction flow rate of the suctioning portion 25 in accordance with the viscosity of the liquid.

The control portion 32 may be one or more processors that execute various processes in accordance with a computer program. The control portion 32 may be one or more dedicated hardware circuits such as application-specific integrated circuits that execute at least some of various processes. The control portion 32 may be a circuit including a combination of the above-mentioned processor and the above-mentioned hardware circuit. The processor includes a CPU and a memory such as a RAM and a ROM. The memory stores a program code or a command configured to cause the CPU to execute processing. The memory, i.e., a computer readable medium, includes all types of readable media that are accessible with a general-purpose or dedicated computer.

Specific Configuration of Liquid Ejecting Device

Next, the configurations of the reservoir portion 20, the discharging channel 21, the confluence channel 22, and the opening unit 23 are described.

First, the reservoir portion 20 is described. Since the plurality of reservoir portions 20 have the same configuration, one reservoir portion 20 is described here.

Figure 2:
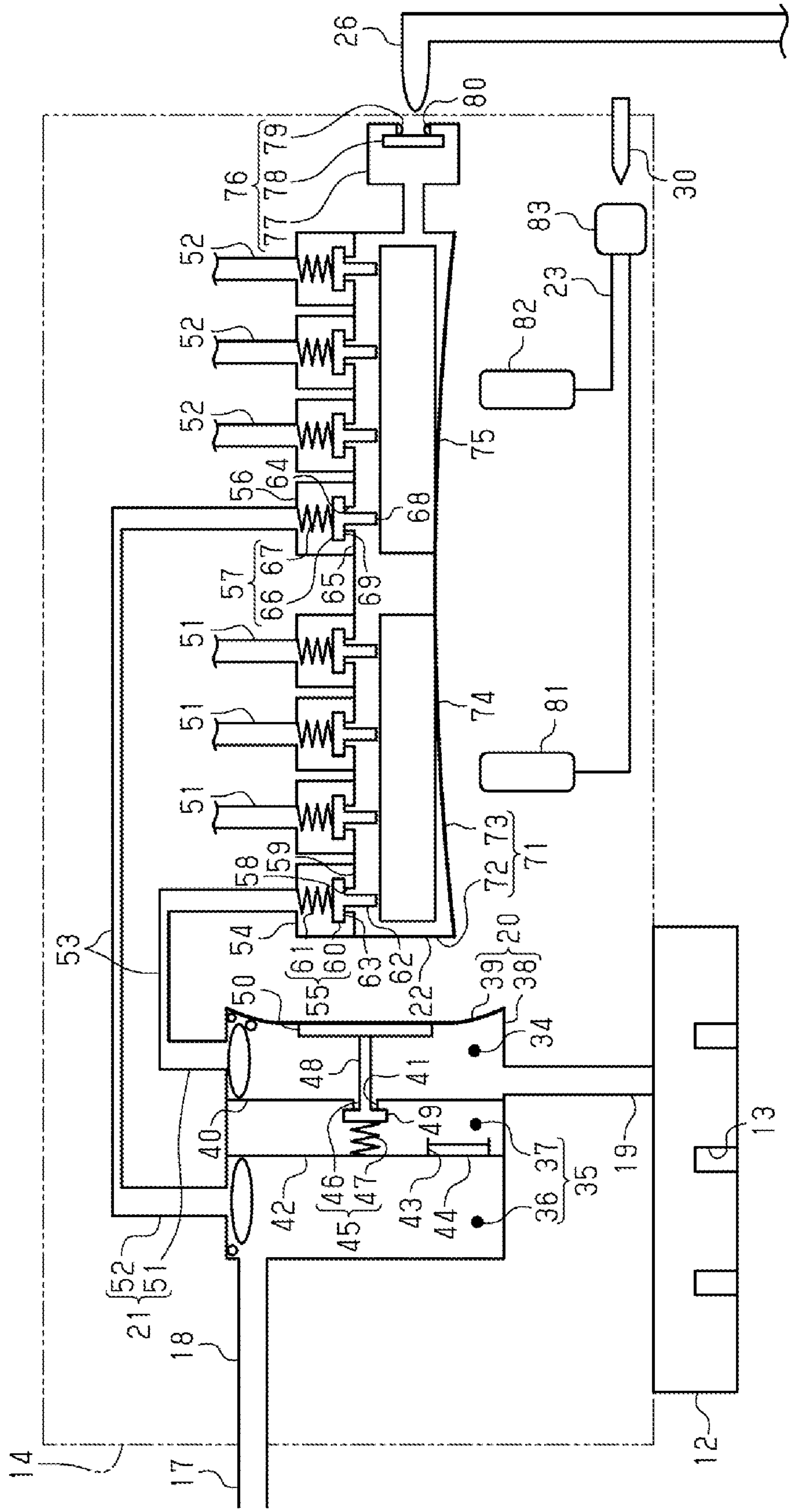
FIG. 2 is a schematic view illustrating a reservoir portion, an discharging channel, and a confluence channel.

As illustrated in FIG. 2, the reservoir portion 20 includes a storage chamber 34. The storage chamber 34 leads to the first supply channel 18. The liquid supplied from the supply source 16 is stored in the storage chamber 34.

The reservoir portion 20 may include a filter chamber 35. The filter chamber 35 includes a first filter chamber 36 and a second filter chamber 37, for example. The first filter chamber 36 is located upstream of the second filter chamber 37 in the direction in which the liquid flows from the supply source 16 to the head 12. Therefore, the liquid flows from the first filter chamber 36 to the second filter chamber 37 in the filter chamber 35.

The filter chamber 35 is located upstream of the storage chamber 34. Therefore, the liquid flows through the filter chamber 35 and the storage chamber 34 in this order in the reservoir portion 20. Specifically, the liquid flows through the first filter chamber 36, the second filter chamber 37 and the storage chamber 34 in this order.

In this example, the first supply channel 18 leads to the first filter chamber 36. The second supply channel 19 leads to the storage chamber 34. Thus, in this example, the storage chamber 34 leads to the first supply channel 18 through the filter chamber 35. The storage chamber 34 may directly lead to the first supply channel 18.

The reservoir portion 20 may lead to a reservoir member 38 and a flexible film 39, for example. The reservoir member 38 is a resin case, for example. The flexible film 39 is a flexible film, for example. The reservoir portion 20 is configured to be able to store the liquid with the flexible film 39 bonded to the reservoir member 38. The reservoir member 38 is coupled to the first supply channel 18 and the second supply channel 19. The reservoir member 38 defines the storage chamber 34 and the filter chamber 35. The flexible film 39 defines the storage chamber 34. Therefore, when the flexible film 39 is displaced, the volume of the storage chamber 34 changes.

The reservoir member 38 includes a partition wall 40, for example. The partition wall 40 is a wall that partitions the inside of the reservoir portion 20. The partition wall 40 partitions the inner space of the reservoir portion 20 into the storage chamber 34 and the filter chamber 35. In the partition wall 40, a through hole 41 communicating between the storage chamber 34 and the filter chamber 35 opens.

The reservoir member 38 includes a separation wall 42, for example. The separation wall 42 is a wall that divides the filter chamber 35 into the first filter chamber 36 and the second filter chamber 37. In the separation wall 42, a mounting hole 43 communicating between the first filter chamber 36 and the second filter chamber 37 opens.

The reservoir portion 20 includes a filter 44, for example. The filter 44 is located at the filter chamber 35. The filter 44 is attached to the reservoir member 38. The filter 44 is attached to the separation wall 42. The filter 44 is fitted to the mounting hole 43, for example. Through the filter 44, the liquid flows from the first filter chamber 36 to the second filter chamber 37. When the liquid passes through the filter 44, foreign matters are removed from the liquid.

The reservoir portion 20 may include an adjustment valve 45. The adjustment valve 45 opens and closes the supply channel 17. When the adjustment valve 45 opens, the liquid flows from the first supply channel 18 to the second supply channel 19 through the reservoir portion 20.

The adjustment valve 45 is a valve that adjusts the pressure in the head 12. By adjusting the pressure of the storage chamber 34, the adjustment valve 45 adjusts the pressure in the head 12. When the pressure inside the head 12 becomes a predetermined pressure or lower, the adjustment valve 45 opens the supply channel 17. The adjustment valve 45 adjusts the pressure of the storage chamber 34 such that the pressure in the head 12 becomes a predetermined negative pressure. The adjustment valve 45 includes an adjustment valve member 46 and an adjustment spring 47, for example.

The adjustment valve member 46 includes a shaft portion 48 and a plate portion 49. The shaft portion 48 is inserted in the through hole 41. The plate portion 49 is located at one end of the shaft portion 48. The plate portion 49 is located at the second filter chamber 37. The other end of the shaft portion 48 is located at the storage chamber 34. Therefore, the adjustment valve member 46 is located over the storage chamber 34 and the second filter chamber 37. The other end of the shaft portion 48 makes contact with the flexible film 39. A contact plate 50 that makes contact with the other end of the shaft portion 48 may be attached to the flexible film 39.

The adjustment spring 47 is located at the second filter chamber 37. The adjustment spring 47 makes contact with the separation wall 42 and the plate portion 49, for example. The adjustment spring 47 presses the plate portion 49 toward the partition wall 40. By making contact with the partition wall 40, the plate portion 49 closes the through hole 41.

When the pressure in the storage chamber 34 becomes low, the flexible film 39 is displaced to be brought closer to the partition wall 40. For example, when the head 12 ejects the liquid and as a result the pressure of the storage chamber 34 becomes low, the flexible film 39 is displaced such that the volume of the storage chamber 34 becomes small. In this manner, the flexible film 39 presses the adjustment valve member 46 toward the adjustment spring 47.

The force of the flexible film 39 pressing the adjustment valve member 46 exceeds the force of the adjustment spring 47 pressing the adjustment valve member 46, the plate portion 49 is separated away from the partition wall 40. When the plate portion 49 is separated from the partition wall 40, the through hole 41 is opened. In this manner, the liquid flows from the second filter chamber 37 to the storage chamber 34. When the liquid flows into the storage chamber 34, the pressure in the storage chamber 34 becomes high. When the pressure in the storage chamber 34 becomes high, the flexible film 39 is displaced away from the partition wall 40. As a result, the plate portion 49 makes contact with the partition wall 40. In this manner, the adjustment valve 45 adjusts the pressure of the storage chamber 34 to a predetermined negative pressure.

Next, the discharging channel 21 is described. Since the plurality of discharging channels 21 have the same configuration, one discharging channel 21 is described here.

The discharging channel 21 includes a first discharging channel 51 and a second discharging channel 52, for example. The first discharging channel 51 and the second discharging channel 52 are coupled to the reservoir member 38. The first discharging channel 51 is a channel that leads to the storage chamber 34. The first discharging channel 51 leads to the upper part of the storage chamber 34, for example. The second discharging channel 52 is a channel that leads to the filter chamber 35. Specifically, the second discharging channel 52 leads to the first filter chamber 36. The second discharging channel 52 leads to the upper part of the first filter chamber 36, for example.

The first discharging channel 51 is a channel for ejecting the bubbles retained at the storage chamber 34. The second discharging channel 52 is a channel for ejecting the bubbles retained at the filter chamber 35. Specifically, the second discharging channel 52 is a channel for ejecting the bubbles retained at the first filter chamber 36.

Each of the first discharging channel 51 and the second discharging channel 52 includes a resistance portion 53. That is, one discharging channel 21 includes two resistance portions 53. The resistance portion 53 is a portion configured to have a large channel resistance when the liquid flows in the first discharging channel 51 and the second discharging channel 52. That is, the resistance portion 53 is a portion where the pressure loss is large when the liquid flows.

The resistance portion 53 is a portion configured to have a larger pressure loss than the supply channel 17 in the discharging channel 21. Specifically, the resistance portion 53 is a portion configured to have a larger pressure loss than the first supply channel 18 in the discharging channel 21. Thus, in one reservoir portion 20, the pressure loss is larger when the liquid flows through the discharging channel 21 coupled with this reservoir portion 20 than when the liquid flows through the supply channel 17 coupled with this reservoir portion 20. Therefore, in one reservoir portion 20, the liquid less easily flows through the discharging channel 21 than through the supply channel 17.

The resistance portion 53 is composed of a portion with a small channel cross-unital area in the discharging channel 21, for example. That is, the resistance portion 53 is configured by thinning the discharging channel 21. Therefore, the channel diameter of the resistance portion 53 is smaller than the channel diameter of the supply channel 17. The resistance portion 53 may be composed of a portion bent in the discharging channel 21, for example. The resistance portion 53 may be configured by increasing the channel length of the discharging channel 21, for example. The discharging channel 21 need only be configured such that the liquid less easily flows than in the supply channel 17.

The discharging channel 21 includes a plurality of containers, and a plurality of opening/closing valves. Specifically, one discharging channel 21 includes two containers. One discharging channel 21 includes two opening/closing valves. The first discharging channel 51 includes a first container 54 and a first opening/closing valve 55. The second discharging channel 52 includes a second container 56 and a second opening/closing valve 57. The first container 54 and the second container 56 have the same configuration. The first opening/closing valve 55 and the second opening/closing valve 57 have the same configuration.

The first container 54 is located at the first discharging channel 51. The first container 54 contains the first opening/closing valve 55. The first container 54 makes up an end portion of the first discharging channel 51. The first container 54 is coupled to the confluence channel 22. The first container 54 includes a first opening plate 59 where a first coupling port 58 opens. Through the first coupling port 58, the inside of the first container 54 and the inside of the confluence channel 22 lead to each other. That is, through the first coupling port 58, the inside of the first discharging channel 51 and the inside of the confluence channel 22 lead to each other.

The first opening/closing valve 55 is an opening/closing valve provided in the first discharging channel 51. The first opening/closing valve 55 opens and closes the first discharging channel 51. Normally, the first opening/closing valve 55 closes the first discharging channel 51. Therefore, normally, the first discharging channel 51 is closed to the confluence channel 22. The first opening/closing valve 55 includes a first opening/closing valve member 60 and a first opening closing spring 61. The first opening/closing valve member 60 and the first opening closing spring 61 are contained in the first container 54. The first opening/closing valve 55 is opened by the opening unit 23.

The first opening/closing valve member 60 includes a first shaft portion 62 and a first plate portion 63, for example. The first shaft portion 62 is inserted in the first coupling port 58. The first plate portion 63 is located at one end of the first shaft portion 62. The first plate portion 63 is located in the first container 54. The other end of the first shaft portion 62 is located in the confluence channel 22. Thus, the first opening/closing valve member 60 is located over the first container 54 and the confluence channel 22.

The first opening closing spring 61 is located in the first container 54. The first opening closing spring 61 makes contact with the first plate portion 63. The first opening closing spring 61 presses the first opening/closing valve member 60 toward the confluence channel 22. The first opening closing spring 61 presses the first plate portion 63 toward the first opening plate 59. The first plate portion 63 closes the first coupling port 58 by making contact with the first opening plate 59. In this manner, the first discharging channel 51 is closed.

The second container 56 is located at the second discharging channel 52. The second container 56 contains the second opening/closing valve 57. The second container 56 makes up an end portion of the second discharging channel 52. The second container 56 is coupled to the confluence channel 22. The second container 56 includes a second opening plate 65 where a second coupling port 64 opens. Through the second coupling port 64, the inside of the second container 56 and the inside of the confluence channel 22 lead to each other. That is, through the second coupling port 64, the inside of the second discharging channel 52 and the inside of the confluence channel 22 lead to each other.

The second opening/closing valve 57 is an opening/closing valve provided in the second discharging channel 52. The second opening/closing valve 57 opens and closes the second discharging channel 52. Normally, the second opening/closing valve 57 closes the second discharging channel 52. Therefore, normally, the second discharging channel 52 is closed to the confluence channel 22. The second opening/closing valve 57 includes a second opening/closing valve member 66 and a second opening closing spring 67. The second opening/closing valve member 66 and the second opening closing spring 67 are contained in the second container 56. The second opening/closing valve 57 is opened by the opening unit 23.

The second opening/closing valve member 66 includes a second shaft portion 68 and a second plate portion 69, for example. The second shaft portion 68 is inserted in the second coupling port 64. The second plate portion 69 is located at one end of the second shaft portion 68. The second plate portion 69 is located in the second container 56. The other end of the second shaft portion 68 is located in the confluence channel 22. Thus, the second opening/closing valve member 66 is located over the second container 56 and the confluence channel 22.

The second opening closing spring 67 is located in the second container 56. The second opening closing spring 67 makes contact with the second plate portion 69. The second opening closing spring 67 presses the second opening/closing valve member 66 toward the confluence channel 22. The second opening closing spring 67 presses the second plate portion 69 toward the second opening plate 65. The second plate portion 69 closes the second coupling port 64 by making contact with the second opening plate 65. In this manner, the second discharging channel 52 is closed.

Next, the confluence channel 22 is described.

The confluence channel 22 includes a confluence part 71. A plurality of containers are coupled to the confluence part 71. A plurality of the first containers 54 and a plurality of the second containers 56 are coupled to the confluence part 71. That is, a plurality of the first discharging channels 51 and a plurality of the second discharging channels 52 are coupled to the confluence part 71. The bubbles, liquid and the like flow into the confluence part 71 through the discharging channel 21. The confluence part 71 includes a confluence member 72 and a flexible film 73.

The confluence member 72 is coupled to a plurality of containers. The confluence member 72 is a resin case, for example. The flexible film 73 is attached to the confluence member 72. The flexible film 73 is a flexible film, for example. When the flexible film 73 is displaced, the volume of the confluence part 71 changes.

The confluence channel 22 includes a plurality of operation plates. The confluence channel 22 includes two operation plates, for example. More specifically, the confluence channel 22 includes a first operation plate 74 and a second operation plate 75. The first operation plate 74 and the second operation plate 75 are located in the confluence part 71.

The first operation plate 74 can make contact with a plurality of the first opening/closing valve members 60. More specifically, the first operation plate 74 can make contact with a plurality of the first shaft portions 62. In this example, the first operation plate 74 can make contact with each of four first shaft portions 62. The second operation plate 75 can make contact with a plurality of the second opening/closing valve members 66. More specifically, the second operation plate 75 can make contact with a plurality of the second shaft portions 68. In this example, the second operation plate 75 can make contact with four second shaft portions 68.

When the first operation plate 74 comes closer to the first container 54, the first opening/closing valve member 60 is pushed by the first operation plate 74. When the first opening/closing valve member 60 is pushed by the first operation plate 74, the first plate portion 63 is separated away from the first opening plate 59. In this manner, the first operation plate 74 opens the plurality of the first discharging channels 51 at the same time.

When the second operation plate 75 comes closer to the second container 56, the second opening/closing valve member 66 is pushed by the second operation plate 75. When the second opening/closing valve member 66 is pushed by the second operation plate 75, the second plate portion 69 is separated away from the second opening plate 65. In this manner, the second operation plate 75 opens the plurality of the second discharging channels 52 at the same time.

The confluence channel 22 includes an insertion portion 76. The coupling portion 26 is inserted in the insertion portion 76. When the coupling portion 26 is inserted in the insertion portion 76, the confluence channel 22 and the suctioning portion 25 are coupled to each other. That is, when the coupling portion 26 is inserted in the insertion portion 76, the plurality of discharging channels 21 and the suctioning portion 25 are coupled to each other. The insertion portion 76 includes an insertion member 77, a valve portion 78, and a sealing part 79.

The insertion member 77 is contiguous with the confluence member 72. The inside of the insertion member 77 leads to the inside of the confluence member 72. The bubbles and liquid flown into the confluence member 72 flow into the insertion member 77. A coupling port 80 opens at the insertion member 77. The coupling portion 26 is inserted in the coupling port 80.

The valve portion 78 is located in the insertion member 77. The valve portion 78 opens and closes the confluence channel 22. Normally, the valve portion 78 closes the coupling port 80. The confluence channel 22 is closed by the valve portion 78. The valve portion 78 opens the confluence channel 22 when the coupling portion 26 is inserted in the insertion member 77. The valve portion 78 is separated away from the coupling port 80 when pushed by the coupling portion 26 inserted in the insertion member 77, for example. In this manner, the confluence channel 22 is opened.

The sealing part 79 is attached to the insertion member 77. The sealing part 79 is located at the coupling port 80. When the coupling portion 26 is inserted in the coupling port 80, the sealing part 79 seals the coupling portion 26 and the insertion member 77. When the coupling portion 26 is inserted in the insertion portion 76, the sealing part 79 makes intimate contact with the outer peripheral surface of the coupling portion 26, for example. In this manner, the sealing part 79 seals the coupling portion 26 and the insertion member 77. In this manner, the risk of leakage of the liquid from the coupling port 80 is reduced.

When the suctioning portion 25 applies a negative pressure to the plurality of discharging channels 21, the carriage 14 moves to the home position. At this time, along with the movement of the carriage 14, the coupling portion 26 makes contact with the sealing part 79 first. When the carriage 14 further moves, the coupling portion 26 makes contact with the valve portion 78 while making contact with the sealing part 79. When the carriage 14 further moves, the coupling portion 26 is inserted in the insertion portion 76.

When applying a negative pressure to the plurality of discharging channels 21, the suctioning portion 25 is driven in the state where the sealing part 79 is in intimate contact with the coupling portion 26 and the confluence channel 22 is closed with the valve portion 78, for example. For example, the control portion 32 starts the driving of the suctioning portion 25 before the coupling portion 26 is inserted in the insertion portion 76. After the negative pressure of the suctioning portion 25 reaches a predetermined pressure, the carriage 14 opens the confluence channel 22 by moving such that the coupling portion 26 is inserted in the insertion portion 76. In this manner, the air less flows back to the confluence channel 22 in comparison with the case where the driving of the suctioning portion 25 is started after the coupling portion 26 is inserted in the insertion portion 76. That is, the risk of inflow of the air into the confluence channel 22 through the coupling port 80 is reduced.

Next, the opening unit 23 is described.

The opening unit 23 includes a plurality of opening members. The opening unit 23 includes a first opening member 81 and a second opening member 82, for example. The first opening member 81 is a member that opens the first discharging channel 51. The second opening member 82 is a member that opens the second discharging channel 52.

The first opening member 81 can move closer to or away from the confluence channel 22. The first opening member 81 makes contact with the first operation plate 74 through the flexible film 73 by coming closer to the confluence channel 22. The first opening member 81 presses the first operation plate 74 toward the first discharging channel 51 by coming closer to the confluence channel 22. In this manner, the plurality of the first discharging channels 51 are opened at the same time.

The second opening member 82 can move closer to or away from the confluence channel 22. The second opening member 82 makes contact with the second operation plate 75 through the flexible film 73 by coming closer to the confluence channel 22. The second opening member 82 presses the second operation plate 75 toward the second discharging channel 52 by coming closer to the confluence channel 22. In this manner, the plurality of the second discharging channels 52 are opened at the same time.

The opening unit 23 includes a linking unit 83. When the starting unit 30 makes contact with the linking unit 83, the linking unit 83 operates one of the first opening member 81 and the second opening member 82.

The linking unit 83 is configured to be able to switch the linking target between the first opening member 81 and the second opening member 82. For example, the control portion 32 switches the linking target of the linking unit 83 between the first opening member 81 and the second opening member 82. When the starting unit 30 makes contact with the linking unit 83 in the state where the linking unit 83 is in linkage with the first opening member 81, the linking unit 83 is displaced and as a result the first opening member 81 comes closer to the confluence channel 22. When the starting unit 30 makes contact with the linking unit 83 in the state where the linking unit 83 is in linkage with the second opening member 82, the linking unit 83 is displaced and as a result the second opening member 82 comes closer to the confluence channel 22. When the starting unit 30 makes contact with the linking unit 83, the plurality of the first discharging channels 51, or the plurality of the second discharging channels 52 are opened. In this example, since the linking unit 83 and one of the first opening member 81 and the second opening member 82 are linked with each other, the plurality of the first discharging channels 51 and the plurality of the second discharging channels 52 are not simultaneously opened. Thus, the first opening/closing valve 55 and the second opening/closing valve 57 are individually opened and closed by being linked with movement the carriage 14. In this manner, the bubbles can be suctioned individually at the storage chamber 34 and the filter chamber 35.

Suction of Bubbles

Next, suction of bubbles is described.

The amount of bubbles may be uneven among the plurality of reservoir portions 20. In this case, when the suctioning portion 25 applies a negative pressure to the plurality of reservoir portions 20, there is a risk of occurrence of a situation where while the bubbles are suctioned from one reservoir portion 20, the liquid is suctioned from another reservoir portion 20. That is, there is a risk of wasteful consumption of the liquid.

Each of the first discharging channel 51 and the second discharging channel 52 includes the resistance portion 53. The resistance portion 53 causes a difference in pressure loss between a case where the liquid flows through the discharging channel 21 and a case where the bubbles flow through the discharging channel 21. The pressure loss is smaller in the case where the bubbles flow through the discharging channel 21 than in the case where the liquid flows through the discharging channel 21. Thus, the negative pressure of the suctioning portion 25 intensively acts on the discharging channel 21 through which the bubbles flow. As a result, the liquid less flows from the reservoir portion 20 containing no bubbles. In this manner, the bubbles are preferentially suctioned from the reservoir portion 20 containing the bubbles among the plurality of reservoir portions 20.

To preferentially suction the bubbles, it is necessary to increase the pressure loss of the discharging channel 21 through which the liquid flows. Therefore, it is preferable that the suction flow rate of the suctioning portion 25 be large. On the other hand, if the suction flow rate of the suctioning portion 25 is excessively large, the pressure in the reservoir portion 20 may be lower than necessary, and air may flow into the head 12 from the nozzle 13. Therefore, to preferentially suction the bubbles, it is preferable that the suction flow rate of the suctioning portion 25 be large enough not to suction the air from the nozzle 13.

When the bubbles are suctioned from the storage chamber 34 through the first discharging channel 51, there is a significant risk of inflow of the air into the head 12 from the nozzle 13 because the storage chamber 34 leads to the inside of the head 12. On the other hand, when the bubbles are suctioned from the filter chamber 35 through the second discharging channel 52, the risk of inflow of the air into the head 12 from the nozzle 13 is small because the filter chamber 35 does not lead to the head 12. However, the adjustment valve 45 may unexpectedly open due to interference of other members with the adjustment valve 45, for example. Therefore, also in the case where the bubbles are suctioned from the filter chamber 35 through the second discharging channel 52, it is preferable that the suction flow rate of the suctioning portion 25 be large enough not to suction the air from the nozzle 13.

The viscosity of ink changes depending on the environmental temperature. The lower the environmental temperature, the greater the viscosity of ink. When the viscosity of ink increases, the ink less flows through the discharging channel 21. That is, when the environmental temperature is low, the difference in pressure loss further increases between the discharging channel 21 through which the bubbles flow and the discharging channel 21 through which the liquid flows. Therefore, when the environmental temperature is low, the pressure in the reservoir portion 20 tends to be lower than necessary. In view of this, when the environmental temperature is low, the control portion 32 reduces the suction flow rate of the suctioning portion 25 than when the environmental temperature is high. In this manner, the risk of decrease of the pressure in the reservoir portion 20 more than necessary is reduced.

For example, when the environmental temperature detected by the detection portion 31 is low, the control portion 32 reduces the suction flow rate of the suctioning portion 25 than when the environmental temperature is high. For example, when the environmental temperature is low, the control portion 32 reduces the rotational frequency of the suctioning portion 25 than when the environmental temperature is high.

Suction Flow Rate of Suctioning Portion

Next, an example of a method of determining the suction flow rate of the suctioning portion 25 is described.

When the suctioning portion 25 performs the suctioning when the bubbles are retained in only one reservoir portion 20 of the plurality of reservoir portions 20, the negative pressure of the suctioning portion 25 concentrates on that reservoir portion 20. Therefore, when the bubbles are retained in only one reservoir portion 20 of the plurality of reservoir portions 20, the pressure in that reservoir portion 20 is most significantly reduced. In view of this, a case where the bubbles are retained only in the reservoir portion 20 for storing black ink among the four reservoir portions 20 is considered here. To determine the suction flow rate of the suctioning portion 25, the following variables are defined.

[Equation 1]

$P_{fk}$ … INNER PRESSURE OF FILTER CHAMBER FOR STORING BLACK INK $P_{fc}$ … INNER PRESSURE OF FILTER CHAMBER FOR STORING CYAN INK $P_{fm}$ … INNER PRESSURE OF FILTER CHAMBER FOR STORING MAGENTA INK $P_{fy}$ … INNER PRESSURE OF FILTER CHAMBER FOR STORING YELLOW INK $P_{pk}$ … INNER PRESSURE OF STORAGE CHAMBER FOR STORING BLACK INK $P_{pc}$ … INNER PRESSURE OF STORAGE CHAMBER FOR STORING CYAN INK $P_{pm}$ … INNER PRESSURE OF STORAGE CHAMBER FOR STORING MAGENTA INK $P_{py}$ … INNER PRESSURE OF STORAGE CHAMBER FOR STORING YELLOW INK $P_n$ … INNER PRESSURE OF COUPLING UNIT $P_t$ … HEAD PRESSURE OF SUPPLY SOURCE WITH REFERENCE TO HEAD $P_m$ … PRESSURE RESISTANCE OF NOZZLE $P_s$ … OPERATING PRESSURE OF ADJUSTMENT VALVE $k$ … PROPORTIONALITY COEFFICIENTREPRESENTING PRESSURE LOSS OF SUPPLY CHANNEL $$r \cdots \frac{\text{PROPORTIONALITY COEFFICIENT REPRESENTING PRESSURE LOSS OF EJECTING CHANNEL}}{\text{PROPORTIONALITY COEFFICIENT REPRESENTING PRESSURE LOSS OF SUPPLY CHANNEL}}$$

$\mu$ … VISCOSITY OF INK $Q_k$ … SUCTION FLOW RATE OF BLACK INK $Q_c$ … SUCTION FLOW RATE OF CYAN INK

-continued $Q_m$ ··· SUCTION FLOW RATE OF MAGENTA INK $Q_y$ ··· SUCTION FLOW RATE OF YELLOW INK $Q_n$ ··· SUCTION FLOW RATE OF COUPLING UNIT First, a case where the filter chamber 35 is suctioned is considered.

When the pressure loss of the supply channel 17 and the pressure loss of the discharging channel 21 are expressed by the product of the proportionality coefficient, ink viscosity, and suction flow rate, the inner pressures of four filter chambers 35 are expressed as follows.

[Equation 2]

$$P_{fk}=P_t-k\mu Q_k, P_{fc}=P_t-k\mu Q_c, P_{fm}=P_t-k\mu Q_m, P_{fy}=P_t-k\mu Q_y \quad (1)$$

$$P_{fk}=P_n+rk\mu Q_k, P_{fc}=P_n+rk\mu Q_c, P_{fm}=P_n+rk\mu Q_m, P_{fy}=P_n+rk\mu Q_y \quad (2)$$

Here, since the bubbles are retained only in the reservoir portion 20 for storing black ink, the air flows through the discharging channel 21 coupled with this reservoir portion 20. Therefore, the pressure loss of this discharging channel 21 becomes significantly small in comparison with other discharging channels 21 through which the liquid flows. Accordingly, Equation (2) is rewritten as follows.

[Equation 3]

$$P_{fk}=P_n, P_{fc}=P_n+rk\mu Q_c, P_{fm}=P_n+rk\mu Q_m, P_{fy}=P_n+rk\mu Q_y \quad (3)$$

From Equation (1) and Equation (3), the following equation is derived.

[Equation 4]

$$Q_k=\frac{P_t-P_n}{k\mu}, Q_t=Q_m=Q_y=\frac{P_t-P_n}{(r+1)k\mu} \quad (4)$$

The suction flow rate of the coupling portion 26 is the sum of the suction flow rates of each color, and is therefore expressed as in the following equation.

[Equation 5]

$$Q_n=Q_k+Q_c+Q_m+Q_y \quad (5)$$

From Equation (4) and Equation (5), the following equation is derived.

[Equation 6]

$$P_n=P_t-\frac{r+1}{r+4}k\mu Q_n \quad (6)$$

In this example, the inner pressure of the filter chamber 35 for storing black ink is lowest among the four filter chambers 35. Therefore, the inner pressure of this filter chamber 35 is required to be equal to or greater than the pressure resistance of the nozzle 13. The pressure resistance of the nozzle 13 is a pressure with which the meniscus formed at the nozzle 13 is maintained. This condition is expressed by the following equation.

[Equation 7]

$$P_{fk}\geq P_m \quad (7)$$

On the basis of this condition, the following equation is derived from Equation (3) and Equation (6).

[Equation 8]

$$Q_n\leq\frac{(P_t-P_n)\frac{r+4}{r+1}}{k\mu} \quad (8)$$

Equation (8) is an equation that expresses the suction flow rate of the coupling portion 26, i.e., the limitation value of the suction flow rate of the suctioning portion 25. Equation (8) shows that this limitation value is inversely proportional to the ink viscosity. For example, when the ink viscosity becomes 1.5 times, this limitation value becomes 1/1.5 times. The suction flow rate of the suctioning portion 25 is determined so as not to exceed this limitation value.

Next, a case where the storage chamber 34 is suctioned is considered.

The inner pressures of the four storage chambers 34 are adjusted by the adjustment valve 45 so as to be equal to the operating pressure of the adjustment valve 45. The operating pressure of the adjustment valve 45 is the pressure of the storage chamber 34 when the adjustment valve 45 is opened. Accordingly, the inner pressures of the four storage chambers 34 are expressed as follows.

[Equation 9]

$$P_{pk}=P_{pc}=P_{pm}=P_{py}=P_s \quad (9)$$

Here, since the bubbles are retained only in the reservoir portion 20 for storing black ink, the air flows through the discharging channel 21 coupled with this reservoir portion 20. Therefore, the negative pressure of the suctioning portion 25 intensively acts on this discharging channel 21. As a result, the adjustment valve 45 in the reservoir portion 20 for storing black ink opens. When the adjustment valve 45 opens, the inner pressure of the storage chamber 34 becomes equal to the inner pressure of the filter chamber 35. Accordingly, Equation (9) is rewritten as follows.

[Equation 10]

$$P_{pk}=P_t-k\mu Q_k, P_{pc}=P_{py}=P_s \quad (10)$$

As in the case of the filter chamber 35, when the pressure loss of the discharging channel 21 is expressed by the product of the proportionality coefficient, ink viscosity and suction flow rate, the inner pressures of the four storage chambers 34 are expressed as follows.

[Equation 11]

$$P_{pk}=P_n, P_{pc}=P_n+rk\mu Q_c, P_{pm}=P_n+rk\mu Q_m, P_{py}=P_n+rk\mu Q_y \quad (11)$$

From Equation (10) and Equation (11), the following equation is derived.

[Equation 12]

$$Q_k=\frac{P_{gt}-P_n}{k\mu}, Q_c=Q_m=Q_y=\frac{P_y-P_n}{rk\mu} \quad (12)$$

From Equation (5) and Equation (12), the following equation is derived.

[Equation 13]

$$P_n = \frac{1}{r+3}(rP_t - rk\mu Q_n + 3P_s) \tag{13}$$

In this example, the inner pressure of the storage chamber 34 for storing black ink is lowest among the four storage chambers 34. Therefore, the inner pressure of this storage chamber 34 is required to be equal to or greater than the pressure resistance of the nozzle 13. This condition is expressed by the following equation.

[Equation 14]

$$P_{pk} \geq P_m \tag{14}$$

On the basis of this condition, the following equation is derived from Equation (11) and Equation (13).

[Equation 15]

$$Q_n \leq \frac{rP_t - (r+3)P_m + 3P_s}{rk\mu} \tag{15}$$

As with Equation (8), Equation (15) is an equation that expresses the suction flow rate of the coupling portion 26, i.e., the limitation value of the suction flow rate of the suctioning portion 25. Equation (15) shows that this limitation value is inversely proportional to the ink viscosity. For example, when the ink viscosity becomes 1.5 times, this limitation value becomes 1/1.5 times. The suction flow rate of the suctioning portion 25 is determined so as not to exceed this limitation value. Therefore, it is preferable that the suction flow rate of the suctioning portion 25 be determined in accordance with the environmental temperature.

Effects of Liquid Ejecting Device

Next, effects of the above-described embodiment are described.

(1) Each of the plurality of discharging channels 21 includes the resistance portion 53 with a larger pressure loss than corresponding supply channel 17. In the case where the amount of bubbles is uneven among the plurality of reservoir portions 20, a situation may occur where while the bubbles are suctioned from one reservoir portion 20, the liquid is suctioned from another reservoir portion 20, for example. In this case, in the above-described configuration, the liquid less easily flows through the discharging channel 21 due to the resistance portion 53, and thus the bubbles preferentially flow through the discharging channel 21 in the plurality of reservoir portions 20. In this manner, the amount of the liquid suctioned from the reservoir portion 20 is reduced. Thus, the consumption of the liquid during the ejection of the bubbles is suppressed.

(2) The coupling portion 26 is coupled to the confluence channel 22 when the carriage 14 moves to a predetermined position. The suctioning portion 25 applies a negative pressure to the plurality of discharging channels 21 through the coupling portion 26.

With the above-described configuration, the configuration is simplified in comparison with the case where the suctioning portion 25 is coupled to the discharging channel 21 at all times. In the case where the suctioning portion 25 is coupled to the discharging channel 21 at all times, it is necessary to couple the suctioning portion 25 and the discharging channel 21 through a channel that can follow the movement of the carriage 14, for example.

(3) The first opening/closing valve 55 and the second opening/closing valve 57 are individually opened and closed by being linked with the movement of the carriage 14.

With the above-described configuration, when the first opening/closing valve 55 opens, the bubbles retained at the storage chamber 34 are ejected through the first discharging channel 51. When the second opening/closing valve 57 opens, the bubbles retained at the filter chamber 35 are ejected through the second discharging channel 52. Thus, the bubbles can be ejected individually from the storage chamber 34 and the filter chamber 35.

(4) The suctioning portion 25 is driven in the state where the sealing part 79 is in intimate contact with the coupling portion 26 and the confluence channel 22 is closed with the valve portion 78. The carriage 14 opens the confluence channel 22 by moving such that the coupling portion 26 is inserted in the insertion portion 76 after the negative pressure of the suctioning portion 25 reaches a predetermined pressure. With the above-described configuration, the risk of flow back of the air to the confluence channel 22 is reduced in comparison with the case where the driving of the suctioning portion 25 is started after the coupling portion 26 is inserted in the insertion portion 76.

(5) The liquid ejecting device 11 includes the cap 28 that makes contact with the head 12 so as to cover the nozzle 13, and the cap 28 is coupled to the suctioning portion 25. The liquid ejecting device 11 includes the switching portion 29 that switch the coupling destination of the suctioning portion 25 between the coupling portion 26 and the cap 28.

With the above-described configuration, one suctioning portion 25 can suction the coupling portion 26 and the cap 28. Thus, in comparison with the case where the suctioning portion 25 that suctions the inside of the cap 28 is provided separately from the suctioning portion 25 that suctions the discharging channel 21, the configuration of the liquid ejecting device 11 is simplified.

(6) When the environmental temperature detected by the detection portion 31 is low, the control portion 32 reduces the suction flow rate of the suctioning portion 25 than when the environmental temperature is high.

When the suction flow rate of the suctioning portion 25 is large, the air may be drawn into the head 12 from the nozzle 13 when the bubbles are suctioned from the reservoir portion 20. When the suction flow rate of the suctioning portion 25 is small, the pressure loss of the discharging channel 21 through which the liquid flows is small, and consequently there is a risk of occurrence of situation where while the bubbles are suctioned from one reservoir portion 20, the liquid is suctioned from another reservoir portion 20. Therefore, it is preferable that the suction flow rate of the suctioning portion 25 be large enough not to draw the air into the nozzle 13 the head 12.

The viscosity of the liquid changes depending on the environmental temperature. When the viscosity of the liquid changes, the pressure loss of the discharging channel 21 through which the liquid flows changes. For example, when the environmental temperature becomes low, the viscosity of the liquid increases, and consequently, the pressure loss of the discharging channel 21 through which the liquid flows increases. In this case, while the liquid is less easily suctioned, the pressure in the reservoir portion 20 where the discharging channel 21 through which the bubbles flow is coupled tends to become lower than necessary. Consequently, when the environmental temperature is low, the risk of drawing the air into the head 12 from the nozzle 13 tends to increase.

With the above-described configuration, when the environmental temperature is low, the suction flow rate of the suctioning portion 25 is reduced than when the environmental temperature is high, and thus the pressure loss of the discharging channel 21 through which the liquid flows decreases. In this manner, the pressure in the reservoir portion 20 where the discharging channel 21 through which the bubbles flow is coupled does not become lower than necessary. Accordingly, the risk of drawing the air into the head 12 from the nozzle 13 is reduced.

(7) The adjustment valve 45 opens the supply channel 17 when the pressure inside the head 12 becomes a predetermined pressure or lower.

With the above-described configuration, the pressure in the head 12 is adjusted by the adjustment valve 45. In this manner, the head 12 can appropriately eject the liquid.

Modifications of Liquid Ejecting Device

The present embodiment may be modified and implemented as follows. The present embodiment and the following modifications may be combined and implemented insofar as they are not technically inconsistent.

The control portion 32 can change the time for which the suctioning portion 25 applies a negative pressure to the plurality of discharging channels 21 in accordance with the length of the leaving time. For example, the control portion 32 may change the time such that the greater the leaving time, the loner the time for which the suctioning portion 25 applies a negative pressure to the plurality of discharging channels 21. The leaving time may be the time elapsed after the power of the liquid ejecting device 11 is turned off, for example. The leaving time may be the time elapsed from the last bubble suction, for example.

The liquid to be ejected by the head 12 is not limited to inks, and may be a liquid material composed of particles of a functional material dispersed or mixed in liquid, and the like, for example. For example, the head 12 may eject a liquid material containing a material, such as an electrode material or a pixel material used for manufacturing liquid crystal displays, electroluminescence displays and surface-emitted displays, dispersed or dissolved therein.

Technical Ideas of Liquid Ejecting Device

The following describes technical ideas and operational effects of the same derived from the above-described embodiments and modifications.

(A) A liquid ejecting device includes a head including a nozzle and configured to eject, from the nozzle, liquid supplied from a plurality of supply sources, a plurality of supply channels coupled to the plurality of supply sources and the head, a plurality of reservoir portions located respectively at the plurality of supply channels, each of the plurality of reservoir portions including a storage chamber configured to store the liquid supplied from the plurality of supply sources, a plurality of discharging channels respectively coupled to the plurality of reservoir portions, and each configured to eject a bubble from the plurality of storage chambers, and a suctioning portion configured to apply a negative pressure to the plurality of discharging channels. Each of the plurality of discharging channels includes a resistance portion with a larger pressure loss than a corresponding supply channel of the plurality of supply channels.

In the case where the amount of bubbles is uneven among a plurality of reservoir portions, there is a risk of occurrence of a situation where while the bubbles are suctioned from one reservoir portion, the liquid are suctioned from another reservoir portion. In this case, with the above-described configuration, the liquid less easily flows through the discharging channel due to the resistance portion, and thus the bubbles preferentially flow through the discharging channel in the plurality of reservoir portions. In this manner, the amount of the liquid suctioned from the reservoir portion is reduced. Thus, the consumption of the liquid during the ejection of the bubbles is suppressed.

(B) The liquid ejecting device may further include a carriage in which the head and the plurality of reservoir portions are mounted, the carriage being configured to perform scanning with respect to a medium, a confluence channel coupled to the plurality of discharging channels, and a coupling portion configured to be coupled to the confluence channel. The coupling portion may be coupled to the confluence channel when the carriage moves to a predetermined position, and the suctioning portion may apply a negative pressure to the plurality of discharging channels through the coupling portion.

With the above-described configuration, the configuration is simplified in comparison with the case where the suctioning portion is coupled to the discharging channel at all times. In the case where the suctioning portion is coupled to the discharging channel at all times, it is necessary to couple the suctioning portion and the discharging channel with a channel that can follow the movement of the carriage, for example.

(C) In the liquid ejecting device, the discharging channel may include a plurality of opening/closing valves, the reservoir portion may include a filter configured to capture a foreign matter, and a filter chamber located upstream of the storage chamber, the filter chamber being a chamber where the filter is located, the discharging channel may include a first discharging channel that leads to the storage chamber, and a second discharging channel that leads to the filter chamber, the plurality of opening/closing valves may include a first opening/closing valve provided in the first discharging channel, and a second opening/closing valve provided in the second discharging channel, and the first opening/closing valve and the second opening/closing valve are individually opened and closed by being linked with a movement of the carriage.

With the above-described configuration, when the first opening/closing valve opens, the bubbles retained at the storage chamber are ejected through the first discharging channel. When the second opening/closing valve opens, the bubbles retained at the filter chamber are ejected through the second discharging channel. Thus, the bubbles can be ejected individually from the storage chamber and the filter chamber.

(D) In the liquid ejecting device, the confluence channel may include an insertion portion in which the coupling portion is inserted, the insertion portion may include a sealing part configured to make intimate contact with an outer periphery of the coupling portion when the coupling portion is inserted, and a valve portion configured to open the confluence channel when the coupling portion is inserted, the suctioning portion may be driven in a state where the sealing part is in intimate contact with the coupling portion and the confluence channel is closed by the valve portion, and the carriage may open the confluence channel by moving such that the coupling portion is inserted in the insertion portion after a negative pressure of the suctioning portion reaches a predetermined pressure. With the above-described configuration, the risk of flow back of the air to the confluence channel is reduced in comparison with the case where the driving of the suctioning portion is started after the coupling portion is inserted in the insertion portion.

(E) The liquid ejecting device may further include a cap configured to make contact with the head so as to cover the nozzle, the cap being configured to be coupled to the suctioning portion, and a switching portion configured to switch a coupling destination of the suctioning portion between the coupling portion and the cap.

With the above-described configuration, the coupling portion and the cap can be suctioned with one suctioning portion. Thus, in comparison with the case where a suctioning portion that suctions the inside of the cap is provided separately from a suctioning portion that suctions the discharging channel, the configuration of the liquid ejecting device is simplified.

(F) The liquid ejecting device may further include a detection portion configured to detect an environmental temperature, and a control portion configured to control the suctioning portion. When the environmental temperature detected by the detection portion is low, the control portion may set a suction flow rate of the suctioning portion to a rate smaller than when the environmental temperature is high.

If the suction flow rate of the suctioning portion is large, there is the risk of drawing the air into the head from the nozzle when the bubbles are suctioned from the reservoir portion. If the suction flow rate of the suctioning portion is small, the pressure loss of the discharging channel through which the liquid flows is small, there is a risk of occurrence of a situation where while the bubbles are suctioned from one reservoir portion, the liquid is suctioned from another reservoir portion. Therefore, it is preferable that the suction flow rate of the suctioning portion be large enough not to draw the air into the head from the nozzle.

The viscosity of the liquid changes depending on the environmental temperature. When the viscosity of the liquid changes, the pressure loss of the discharging channel through which the liquid flows changes. For example, when the environmental temperature becomes low, the viscosity of the liquid increases, and accordingly the pressure loss of the discharging channel through which the liquid flows increases. In this case, while the liquid is less suctioned, the pressure in the reservoir portion to which the discharging channel through which the bubbles flow is coupled tends to be lower than necessary. Therefore, when the environmental temperature is low, the risk of drawing the air into the nozzle head tends to increase.

With the above-described configuration, when the environmental temperature is low, the pressure loss of the discharging channel through which the liquid flows is reduced by reducing the suction flow rate of the suctioning portion than when the environmental temperature is high. In this manner, the pressure in the reservoir portion to which the discharging channel through which the bubbles flow is coupled does not become lower than necessary. Thus, the risk of drawing the air into the head from the nozzle is reduced.

(G) In the liquid ejecting device, the reservoir portion may include an adjustment valve configured to open and close the supply channel, and when the pressure inside the head becomes a predetermined pressure or lower, the adjustment valve may open the supply channel.

With the above-described configuration, the pressure in the head is adjusted with the adjustment valve. In this manner, the head can appropriately eject the liquid.

What is claimed is:

1. A liquid ejecting device comprising:

a head including a nozzle and configured to eject, from the nozzle, liquid supplied from a plurality of supply sources;

a plurality of supply channels coupled to the plurality of supply sources and the head;

a plurality of reservoir portions located respectively at the plurality of supply channels, each of the plurality of reservoir portions including a storage chamber configured to store the liquid supplied from one of the plurality of supply sources;

a plurality of discharging channels respectively coupled to the plurality of reservoir portions, and each of the plurality of discharging channels being configured to discharge the liquid and a bubble from the plurality of storage chambers;

a suctioning portion configured to apply a negative pressure to the plurality of discharging channels;

a carriage in which the head and the plurality of reservoir portions are mounted, the carriage being configured to perform scanning with respect to a medium;

a confluence channel coupled to the plurality of discharging channels; and a coupling portion configured to be coupled to the confluence channel, wherein each of the plurality of discharging channels includes a resistance portion with a larger pressure loss than a corresponding supply channel of the plurality of supply channels when the liquid flows, each of the plurality of discharging channels include a plurality of opening/closing valves;

each of the plurality of reservoir portions include:

a filter configured to capture a foreign matter, and a filter chamber located upstream of the storage chamber, the filter chamber being a chamber where the filter is located;

each of the plurality of discharging channels includes:

a first discharging channel that communicates to the storage chamber, and a second discharging channel that communicates to the filter chamber;

the plurality of opening/closing valves include:

a first opening/closing valve provided in the first discharging channel, and a second opening/closing valve provided in the second discharging channel; and the first opening/closing valve and the second opening/closing valve are individually opened and closed by being linked with a movement of the carriage.

2. The liquid ejecting device according to claim 1, wherein the confluence channel includes an insertion portion in which the coupling portion is inserted;

the insertion portion includes:

a sealing part configured to make intimate contact with an outer periphery of the coupling portion when the coupling portion is inserted, and a valve portion configured to open the confluence channel when the coupling portion is inserted;

the suctioning portion is driven in a state where the sealing part is in intimate contact with the coupling portion and the confluence channel is closed by the valve portion; and the confluence channel opens by moving the carriage such that the coupling portion is inserted in the insertion portion after a negative pressure by the suctioning portion reaches a predetermined pressure.

3. The liquid ejecting device according to claim 1, wherein the confluence channel includes an insertion portion in which the coupling portion is inserted;

the insertion portion includes:

a sealing part configured to make intimate contact with an outer periphery of the coupling portion when the coupling portion is inserted, and a valve portion configured to open the confluence channel when the coupling portion is inserted;

the suctioning portion is driven in a state where the sealing part is in intimate contact with the coupling portion and the confluence channel is closed by the valve portion; and the confluence channel opens by moving the carriage such that the coupling portion is inserted in the insertion portion after a negative pressure by the suctioning portion reaches a predetermined pressure.

4. The liquid ejecting device according to claim 1, further comprising:

a cap configured to make contact with the head so as to cover the nozzle, the cap being configured to be coupled to the suctioning portion; and a switching portion configured to switch a coupling destination of the suctioning portion between the coupling portion and the cap.

5. The liquid ejecting device according to claim 1, further comprising:

a cap configured to make contact with the head so as to cover the nozzle, the cap being configured to be coupled to the suctioning portion; and a switching portion configured to switch a coupling destination of the suctioning portion between the coupling portion and the cap.

6. The liquid ejecting device according to claim 1, further comprising:

a detection portion configured to detect an environmental temperature; and a control portion configured to control the suctioning portion, wherein when the environmental temperature detected by the detection portion is a first temperature, the control portion sets a suction flow rate of the suctioning portion to a rate smaller than when the environmental temperature is a second temperature higher than the first temperature.

7. The liquid ejecting device according to claim 1, further comprising:

a detection portion configured to detect an environmental temperature; and a control portion configured to control the suctioning portion, wherein when the environmental temperature detected by the detection portion is a first temperature, the control portion sets a suction flow rate of the suctioning portion to a rate smaller than when the environmental temperature is a second temperature higher than the first temperature.

8. The liquid ejecting device according to claim 1, wherein each of the plurality of reservoir portions include an adjustment valve configured to open and close one of the plurality of supply channels; and when a pressure inside the head becomes a predetermined pressure or lower, the adjustment valve opens the one of the plurality of supply channels.

* * * * *